(12) United States Patent
Biswas et al.

(10) Patent No.: US 7,945,097 B2
(45) Date of Patent: May 17, 2011

(54) CLASSIFYING DIGITAL INK INTO A WRITING OR A DRAWING

(75) Inventors: Manoj Biswas, Bellevue, WA (US); Sashi Raghupathy, Redmond, WA (US); Xin Wang, Bellevue, WA (US); Ming Ye, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1029 days.

(21) Appl. No.: 11/804,772

(22) Filed: May 21, 2007

(65) Prior Publication Data

US 2008/0292190 A1 Nov. 27, 2008

(51) Int. Cl.
*G06K 9/34* (2006.01)
*G06K 9/62* (2006.01)

(52) U.S. Cl. ......... 382/186; 382/113; 382/179; 382/224

(58) Field of Classification Search ................... 382/113, 382/177, 179, 186, 224, 225
See application file for complete search history.

(56) References Cited

U.S. PATENT DOCUMENTS

| | | |
|---|---|---|
| 4,680,804 A | 7/1987 | Kuzunuki et al. |
| 5,319,721 A | 6/1994 | Chefalas et al. |
| 5,454,046 A | 9/1995 | Carman, II |
| 5,467,407 A | 11/1995 | Guberman et al. |
| 6,651,221 B1 | 11/2003 | Thompson et al. |
| 6,956,969 B2 | 10/2005 | Loudon et al. |
| 7,010,165 B2 | 3/2006 | Hullender et al. |
| 7,062,090 B2 | 6/2006 | Simmons et al. |
| 7,298,903 B2 * | 11/2007 | Wang et al. .................. 382/186 |
| 2003/0215138 A1 * | 11/2003 | Raghupathy et al. ......... 382/186 |
| 2003/0215139 A1 * | 11/2003 | Shilman et al. ............... 382/186 |
| 2003/0215145 A1 * | 11/2003 | Shilman et al. ............... 382/195 |
| 2006/0050969 A1 | 3/2006 | Shilman et al. |
| 2006/0078202 A1 * | 4/2006 | Shilman et al. ............... 382/186 |
| 2008/0260241 A1 * | 10/2008 | Ye et al. ........................ 382/159 |

OTHER PUBLICATIONS

Kara, et al., "Hierarchical parsing and recognition of hand-sketched diagrams", UIST '04, Oct. 24-27, 2004, Santa Fe, New Mexico, USA.
Namboodiri, et al., "Robust Segmentation of Unconstrained Online Handwritten Documents", http://www.iiit.net/techreports/2004_37. pdf.
Shilman, et al., "Discerning Structure from Freeform Handwritten Notes", http://research.microsoft.com/~patrice/PDF/ink.pdf, Aug. 2005.

* cited by examiner

Primary Examiner — Jon Chang

(57) ABSTRACT

A method for classifying digital ink receives digital ink comprising ink strokes. A plurality of the ink strokes can be classified. A temporal line grouping is performed on a plurality of the classified ink strokes that are grouped to form a temporal line group. The temporal line group is segmented into a cluster. The cluster can be classified.

20 Claims, 9 Drawing Sheets

CLASSIFYING DIGITAL INK INTO A WRITING OR A DRAWING

BACKGROUND

Computers are regularly being used for a variety of purposes throughout the world. As computers have become commonplace, computer manufacturers have continuously sought to make them more accessible and user-friendly. One such effort has been the development of natural input methods, such as submitting data through handwriting. By writing with a stylus or another object onto a digitizer to produce "electronic ink" or "digital ink," a computer user can forego the bulk and inconvenience associated with a keyboard. Handwriting input conveniently may be used, for example, by doctors making rounds, architects on a building site, couriers delivering packages, warehouse workers walking around a warehouse, and in any situation when the use of a keyboard would be awkward or inconvenient. The use of handwriting input is particularly useful when the use of a keyboard and mouse would be inconvenient or inappropriate, such as when the writer is moving, in a quite meeting, or the like. The use of handwriting input also is the natural choice for creating some types of data, such as mathematical formulas, charts, drawings, and annotations.

Currently there are software applications for handwritten electronic ink documents (or digital ink documents) that enable a number of advanced user operations, such as, editing, conversion to text, and beautification. It is noted that these advanced user operations rely on the accuracy of classifying the digital ink of the document as a writing or a drawing. However, since a typical digital ink document contains a mixture of writings and drawings, current techniques for classifying the digital ink can result in an unacceptable number of misclassifications. As such, poor classification accuracy can result in the advanced user operations not performing properly, which can be a frustrating experience for a user.

As such, it is desirable to address one or more of the above issues.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technology for classifying digital ink is disclosed. In one example, a method for classifying digital ink receives digital ink comprising one or more ink strokes. A plurality of the ink strokes can be classified as a writing or as a drawing by a stroke level writing drawing classification engine. A temporal line grouping is performed on a plurality of the ink strokes that are grouped as writing to form a temporal line group. Each temporally grouped line is segmented into clusters. Note that a cluster may be a set of strokes with overlapping projection on the major axis of the temporally grouped line. The clusters are classified as writing or drawing by the line level writing drawing classification engine.

As such, the writing drawing classification of the above method takes place in multiple stages. One of the reasons that the multiple stages of classification are more accurate is that as the stages progress, more context information can be derived which assists in accurately classify ink. Additionally, errors can be prevented from propagating through the stages by doing earlier classification of the evident drawing strokes. Note that an earlier stage may make a mistake. However, later stages (or engines) can override the decisions made by the earlier stages. In this manner, the quality of editing and analysis of digital ink documents can be improved.

The drawings referred to in this description should not be understood as being drawn to scale unless specifically noted.

DETAILED DESCRIPTION

Reference will now be made in detail to embodiments of the present technology for classifying digital ink, examples of which are illustrated in the accompanying drawings. While the technology for classifying digital ink will be described in conjunction with various embodiments, it will be understood that they are not intended to limit the present technology for classifying digital ink to these embodiments. On the contrary, the presented embodiments of the technology for classifying digital ink are intended to cover alternatives, modifications and equivalents, which may be included within the scope the various embodiments as defined by the appended claims. Furthermore, in the following detailed description, numerous specific details are set forth in order to provide a thorough understanding of embodiments of the present technology for classifying digital ink. However, embodiments of the present technology for classifying digital ink may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "accessing", "classifying", "performing", "grouping", "segmenting", "utilizing", "filtering", "producing", "detecting", "outputting", or the like, refer to the actions and processes of a computer system (such as computer 100 of FIG. 1), or similar electronic computing device. The computer system or similar electronic computing device can manipulate and transform data represented as physical (electronic) quantities within the computer system's registers and/or memories into other data similarly represented as physical quantities within the computer system memories and/or registers or other such information storage, transmission, or display devices. Some embodiments of the present technology for classifying digital ink are also well suited to the use of other computer systems such as, for example, optical and virtual computers.

Example Computer System Environment

Figure 1:
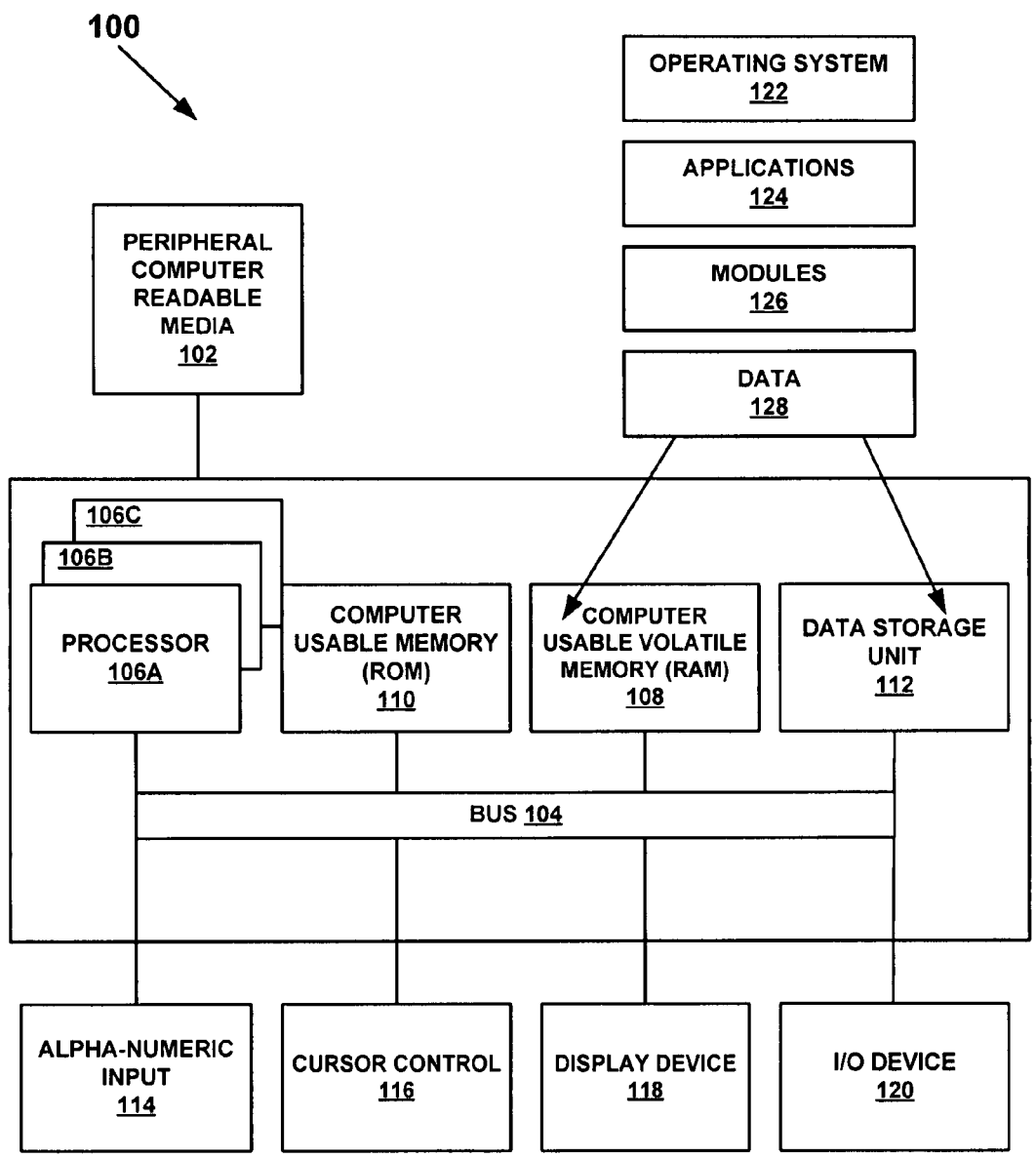
FIG. 1 is a block diagram of an example computer system used in accordance with embodiments of the present technology for classifying digital ink.

With reference now to FIG. 1, all or portions of some embodiments of the technology for classifying digital ink are composed of computer-readable and computer-executable instructions that reside, for example, in computer-usable media of a computer system. That is, FIG. 1 illustrates one example of a type of computer that can be used to implement embodiments, which are discussed below, of the present technology for classifying digital ink. FIG. 1 illustrates an example computer system 100 used in accordance with embodiments of the present technology for classifying digital ink. It is appreciated that system 100 of FIG. 1 is only an example and that embodiments of the present technology for classifying digital ink can operate on or within a number of different computer systems including general purpose networked computer systems, embedded computer systems, routers, switches, server devices, client devices, various intermediate devices/nodes, stand alone computer systems, media centers, handheld computer systems, low-cost computer systems, high-end computer systems, and the like. As shown in FIG. 1, computer system 100 of FIG. 1 is well adapted to having peripheral computer readable media 102 such as, for example, a floppy disk, a compact disc, a DVD, and the like coupled thereto.

System 100 of FIG. 1 can include an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 can also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 can also include an optional alphanumeric input device 114 including alphanumeric and function keys coupled to bus 104 for communicating information and command selections to processor 106A or processors 106A, 106B, and 106C. System 100 can also include an optional cursor control device 116 coupled to bus 104 for communicating user input information and command selections to processor 106A or processors 106A, 106B, and 106C. System 100 of the present embodiment can also include an optional display device 118 coupled to bus 104 for displaying information.

Referring still to FIG. 1, optional display device 118 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (e.g., cursor) on a display screen of display device 118 and indicate user selections of selectable items displayed on display device 118. Many implementations of cursor control device 116 are known in the art including a trackball, mouse, touch pad, joystick or special keys on alpha-numeric input device 114 capable of signaling movement of a given direction or manner of displacement. Alternatively, it is pointed out that a cursor can be directed and/or activated via input from alpha-numeric input device 114 using special keys and key sequence commands. System 100 is also well suited to having a cursor directed by other means such as, for example, voice commands. System 100 can also include an input/output (I/O) device 120 for coupling system 100 with external entities. For example, in one embodiment, I/O device 120 can be a modem for enabling wired and/or wireless communications between system 100 and an external network such as, but not limited to, the Internet.

Referring still to FIG. 1, various other components are depicted for system 100. In embodiments of the present technology, operating system 122 is a modular operating system that is comprised of a foundational base and optional installable features which may be installed in whole or in part, depending upon the capabilities of a particular computer system and desired operation of the computer system. Specifically, when present, all or portions of operating system 122, applications 124, modules 126, and data 128 are shown as typically residing in one or some combination of computer usable volatile memory 108, e.g. random access memory (RAM), and data storage unit 112. However, it is appreciated that in some embodiments, operating system 122 may be stored in other locations such as on a network or on a flash drive (e.g., 102); and that further, operating system 122 may be accessed from a remote location via, for example, a coupling to the internet. In some embodiments, for example, all or part of the present technology for classifying digital ink can be stored as an application 124 or module 126 in memory locations within RAM 108, media within data storage unit 112, and/or media of peripheral computer readable media 102. Likewise, in some embodiments, all or part of the present technology for classifying digital ink may be stored at a separate location from computer 100 and accessed via, for example, a coupling to one or more networks or the internet.

Overview

In one embodiment of the present technology, one factor in analyzing digital ink documents is to mark each stroke as one of two types: a writing or a drawing. It can be desirable that this decision is made early in a process so that text centric modules or engines (e.g., line finding, outline engine, bullet detection engines, etc.) can give proper consideration to corresponding text strokes while drawing processing engines (e.g., container connector, shape recognizer, annotation engine, etc.) can process the drawing strokes appropriately. It is pointed out that poor classification accuracy can lead to poor performance in later analysis. Another reason for improving the classification of the digital ink is that a number of user operations such as editing, conversion to text, beautification, and the like can operate better if there is a reliable way to distinguish between what is writing and what is drawing. Therefore, it is desirable to have accurate classification of digital ink writings and digital ink drawings. In order to improve classification accuracy in various embodiments, the classification of digital ink can employ one or more machine learning based techniques.

Note that in various embodiments, the classification of digital ink into a writing or a drawing can occur in multiple stages, but is not limited to such. For example in an embodiment, a first stage (e.g., stroke-level module or engine) can analyze the stroke data of the digital ink, while a second stage (e.g., line-level module or engine) can utilize contextual information of the digital ink in addition to line information. It is noted that more than two stages can be utilized to classify the digital ink into a writing or a drawing. In one embodiment, one or more of the multiple stages can utilize any of the variations of machine learning techniques. For example, the one or more machine learning techniques can include, but are not limited to, a binary AdaBoost decision-tree, a decision tree, a neural network, an AdaBoost decision tree, the Hidden Markov Model technique, a conditional random field (CRF) technique, a support vector machine, a machine learning-based classification technique, or any combination thereof. As such in various embodiments, the writing drawing classification of digital ink can take place in multiple stages.

System For Classifying Digital Ink

Figure 2:
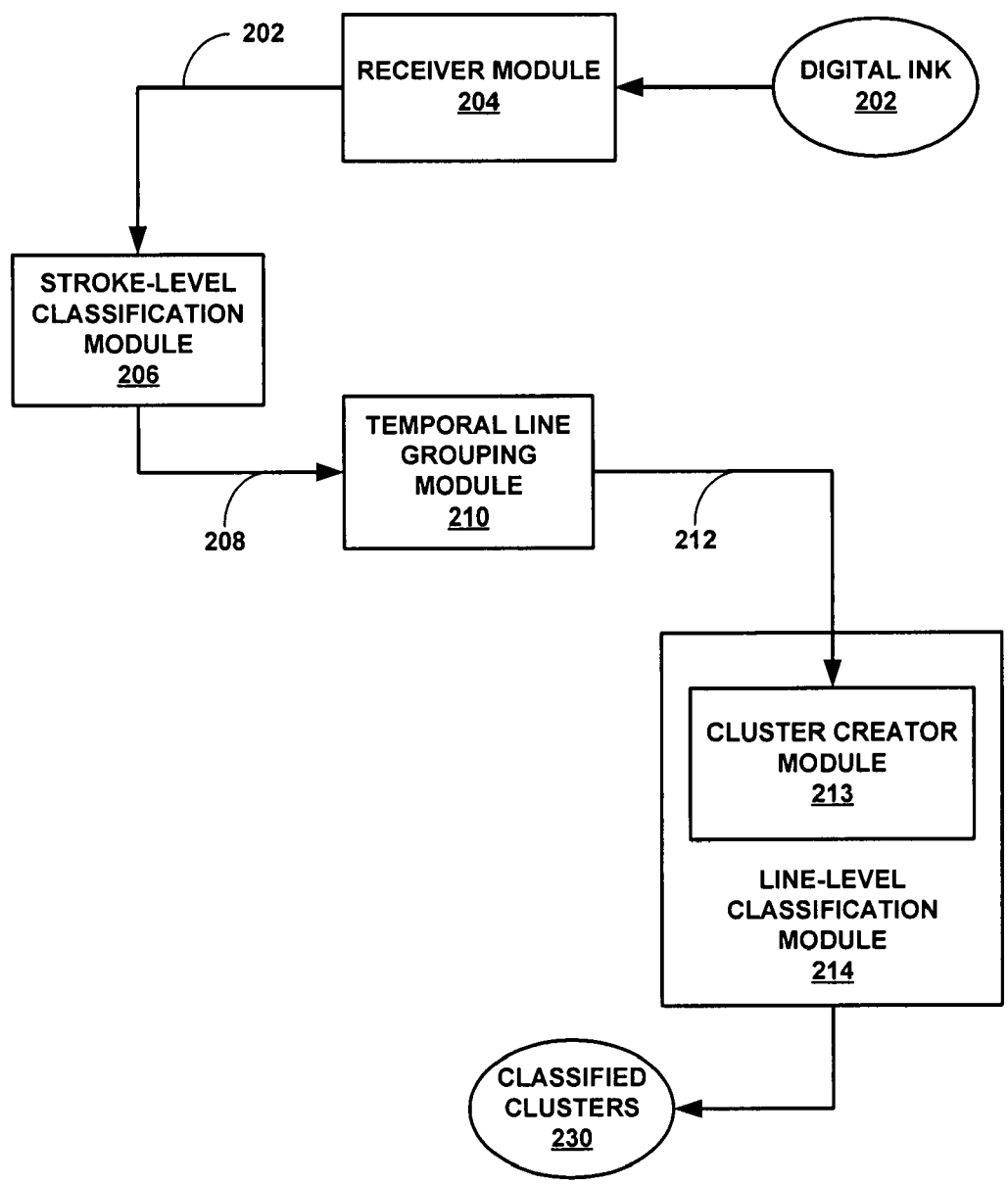
FIG. 2 is a block diagram of an example system for classifying digital ink, according to one embodiment of the present technology.

FIG. 2 is a block diagram of an example system 200 for classifying digital ink according to one embodiment of the present technology. The digital ink classification system 200 can, in one embodiment, classify received digital ink 202 into a writing (or text) category or a drawing category by utilizing a multi-stage process. As show in FIG. 2, the digital ink classification system 200 can include, but is not limited to, a receiver module 204, a stroke-level classification module 206, a temporal line grouping module 210, a cluster creator module 213, and a line-level classification module 214.

For purposes of clarity of description, functionality of each of the components in FIG. 2 is shown and described separately. However, it is pointed out that in some embodiments, inclusion of a component described herein may not be required. It is also understood that, in some embodiments, functionalities ascribed herein to separate components may be combined into fewer components or distributed among a greater number of components.

As shown in FIG. 2, the receiver module 204 of the digital ink classification system 200 can be coupled to receive digital ink or electronic ink 202. It is pointed out that the digital ink 202 can be received from any type of device that stores and/or generates digital ink, such as, a tablet PC, a handheld portable computing device, a computer system, and the like. Furthermore, the digital ink 202 can be implemented in a wide variety of ways. For example in an embodiment, the digital ink 202 can be implemented as a page or document of digital or electronic ink or the digital ink 202 can include one or more digital or electronic ink strokes received in real-time. Upon reception of the digital ink 202, the receiver module 204 can function as a conduit and transfer or transmit the digital ink 202 to the stroke-level classification module 206.

The stroke-level classification module 206 can be coupled to the receiver module 204 and as such, can be configured for receiving digital ink 202, which comprises ink strokes. Additionally, the stroke-level classification module 206 can be configured for classifying one or more of the received ink strokes as a writing or as a drawing. It is noted that the stroke-level classification module 206 can perform this functionality in a wide variety of ways. For example, the stroke-level classification module 206 can utilize one or more machine learning techniques to perform the stroke level classification. Note that the one or more machine learning techniques can include, but are not limited to, a Hidden Markov Model, a decision tree, an AdaBoost decision tree, a neural network, a conditional random field technique, a support vector machine, and a machine learning classification technique. In one embodiment, the stroke-level classification module 206 can utilize one or more machine learning techniques, such as, a combination of Neural Network and Hidden Markov Model techniques to perform the stroke level classification, but is not limited to such. The stroke-level classification module 206, which can be referred to as a machine learning based classifier, can be trained with carefully chosen labeled data. Note that a portion of the training data can be selected at random and preserved for evaluating the stroke-level classification module 206 at an intermediate stage.

Figure 3:
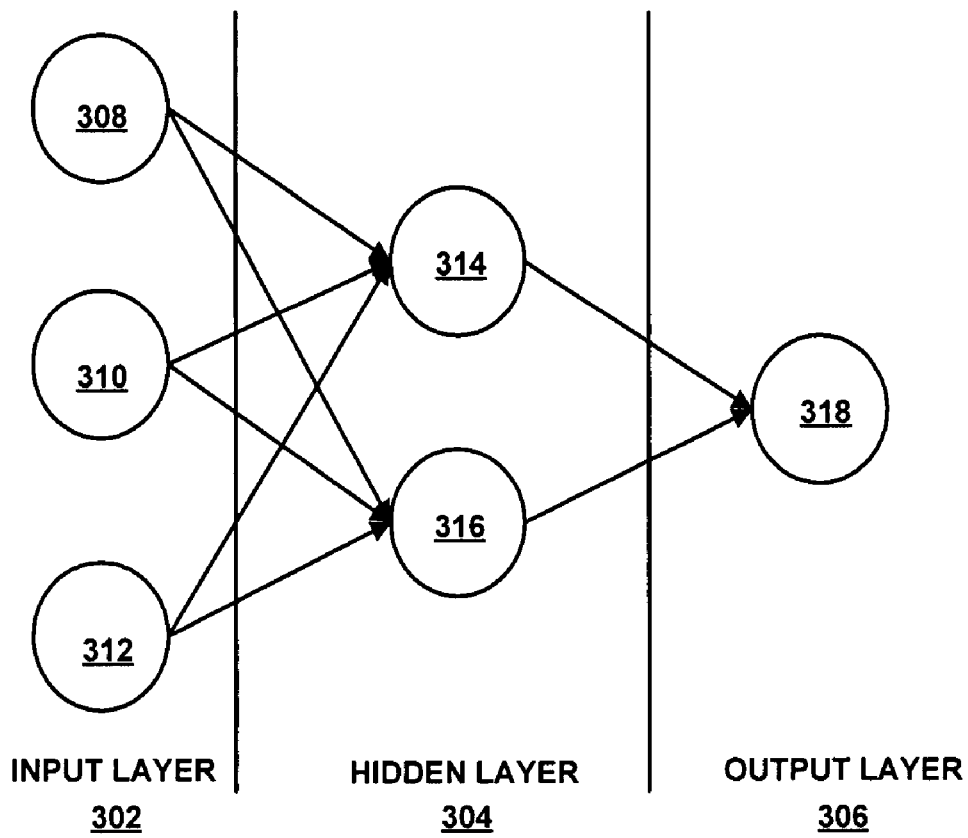
FIG. 3 is a diagram of an example neural network that can be utilized in accordance with one embodiment of the present technology.

FIG. 3 is a diagram of an example neural network 300 that can be utilized by the stroke-level classification module 206 in accordance with one embodiment of the present technology. For example, one or more attributes ('features') of the classification entities can be fed into the input layer 302 of the neural network 300. Note that each input node 308, 310 and 312 can be coupled to one or more nodes (e.g., 314 and 316) of the 'hidden' layer 304. Each connection within neural network 300 has an associated weight. At each node, all weighted features can be summed up and normalized ('activated'). The result can be fed to all nodes of the next layer of the neural network 300. It is pointed out that the last hidden layer (e.g., 304) can feed activation to the output layer 306. In one embodiment, as part of utilizing neural network 300, the stroke-level classification module 206 can extract one or more features from each ink stroke of the received digital ink 202. In one embodiment, the neural network 300 has one hidden layer 304 and the number of nodes (e.g., 314 and 316) in the hidden layer 304 can be determined by the training algorithm used with the stroke-level classification module 206. Within the neural network 300, there can be one output node 318 of the output layer 306 that can output the probability of each input ink stroke of the digital ink 202 being a writing. The features that can be extracted from each ink stroke by the stroke-level classification module 206 and used in the neural network 300 can include, but is not limited to, one or more of the following: stroke length normalized by the page font size, stroke curvature, sine of twice the angle of the major axis of the stroke, cosine of the above angle, regression fitting confidence, number of fragments, normalized length of the largest fragment, curvature of the largest fragment, sine of twice the angle of the major axis of the largest fragment, cosine of the same, and width of the largest fragment projected along its major axis. Also in addition, one or more contextual features from nearby (or surrounding) ink structures of each ink stroke can be extracted by the stroke-level classification module 206 and used in the neural network 300.

As previously mentioned, the stroke-level classification module 206 of FIG. 2 can also utilize the Hidden Markov Model technique to perform the stroke level classification. For example, a Hidden Markov Model (HMM) can be coupled with the output of the neural network 300 in order to receive its result. It is noted that HMM is a sequence based machine learning technique and can be trained on the sequence data as well. It is noted that for the classification of digital ink into writing or drawing by the stroke-level classification module 206, there can be two states, two prior probabilities, four transition probabilities: from Writing to Writing, from Writing to Drawing, from Drawing to Writing, and from Drawing to Drawing. With these transition probabilities, and prior probabilities (output from the neural network "engine" 300), the stroke-level classification module 206 can assign probability of a stroke being drawing or writing to a stroke sequence. In one embodiment, the stroke-level classification module 206 can be done with a dynamic programming algorithm, called a 'Viterbi Algorithm'. It is pointed out that due to the abundance of writing strokes in a normal inking scenario, the probabilities of writing and drawing strokes can be extremely skewed. As such, this does not help the operation of the Neural Network (e.g., 300). However, in one embodiment, normalization can be done on the output of the neural network 300 to handle this issue. In an embodiment, the stroke-level classification module 206 can classify the ink strokes of the digital ink 202 into two types: writing (or text) strokes and drawing strokes. The stroke-level classification module 206 can output to the temporal line grouping module 210 the information 208 regarding which ink strokes have been classified as writing strokes (if any) and which ink strokes have been classified as drawing strokes (if any). It is noted that the stroke-level classification module 206 can utilize any other machine learning techniques described herein, such as the conditional random field (CRF), to train and decode the sequence data.

Within FIG. 2, the temporal line grouping module 210 can be coupled with the stroke classification module 206. The temporal line grouping module 210 can be configured for receiving any ink strokes 208 classified as writing strokes by the stroke classification module 206. The temporal line grouping module 210 can be configured for performing a temporal line grouping on the one or more of the received writing ink strokes and for producing one or more line groups. In one embodiment, the temporal line grouping module 210 can utilize the time information associated with each writing ink stroke. For example, the temporal line grouping module 210 can take all the non-drawing text (or writing) strokes and order them according to time in which they were created. Next, the temporal line grouping module 210 can divide them into segments that look like a text line (e.g., ink strokes that are substantially linear and are made up of similar size strokes). In one embodiment, the temporal line grouping module 210 can utilize one or more dynamic programming techniques for temporal grouping, but is not limited to such. After this process, the temporal line grouping module 210 can produce decent quality of one or more text lines (or line groups), but there may also be one or more errors that exist. The one or more errors may exist because of one or more incorrectly classified strokes by the stroke classification module 206. However, any errors may be corrected in one or more subsequent modules of system 200. The temporal line grouping module 210 can output to the line-level classification module 214 the one or more text lines (or line groups) 212.

The cluster creator module 213 (which is a subcomponent of the line-level writing drawing classification module 214) can be coupled to receive the one or more text lines (or line groups) 212 and can be configured for segmenting the one or more lines into a plurality of clusters. It is noted that the cluster creator module 213 can operate in a wide variety of ways. For example, the cluster creator module 213 can first segment each received line into one or more clusters. As part of this process, the cluster creator module 213 can project the ink stroke points on the major axis of the line. The ink strokes with overlapping projection on the major axis can be grouped into one cluster by the cluster creator module 213. In one embodiment, it is pointed out that the drawing strokes (misclassified as writing by the stroke level classification module 206) can form separate clusters from writing strokes in most of the cases. In some cases, the drawing strokes (e.g., misclassified as writing by the stroke-level classification module 206) can be mixed with other clusters as well.

Within FIG. 2, the line-level writing drawing classification module 214 can be coupled to receive the clusters from the cluster creator module 213 and these clusters can be the unit on which the line-level writing drawing classification module 214 can operate on. For example in an embodiment, the line-level writing drawing classification module 214 can be configured to classify each cluster as either a writing or a drawing, but is not limited to such. Additionally in an embodiment, the line-level writing drawing classification module 214 can be configured for filtering out any false text lines from any line groups 212. In one embodiment, the line-level classification module 214 can utilize some more advanced features along with the surrounding context information in order to filter out any false text lines. Since the line-level classification module 214 operates on the clusters, one or more clusters from the text line can be converted to drawing while remaining clusters may still remain as text. In an embodiment, the line-level writing drawing classification module 214 can be configured to classify each cluster as either a writing, a drawing, or a composite group (e.g., a mixture of writing and drawing), but is not limited to such. The line-level writing drawing classification module 214 can be implemented in a wide variety of ways. For example, the line-level writing drawing classification module 214 can be implemented with one or more machine learning techniques, such as AdaBoost Decision Tree, a decision tree, Hidden Markov Model, a neural network, a support vector machine, the conditional random field (CRF), and any other machine learning classification techniques described herein, but not limited to such. In one embodiment, nodes in a decision tree can represent decision points and input can be fed into the root node. The root node can make a decision as to which of its descendant nodes is to be traversed, based on the input data. This process continues until a leaf node is reached. The leaf node contains "votes" for each label. It is noted that one path from root to leaf is traversed for a set of input.

Figure 4:
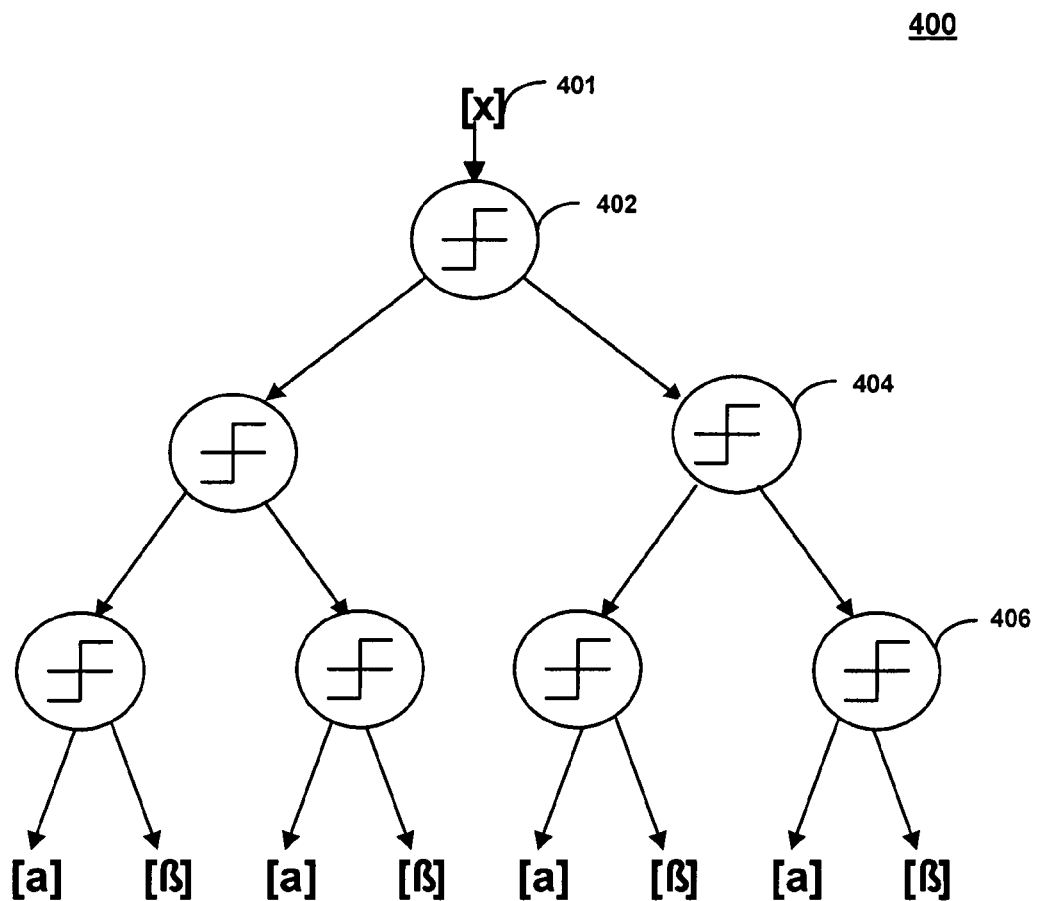
FIG. 4 is an example binary decision tree that can be utilized in accordance with one embodiment of the present technology.

FIG. 4 is an example binary decision tree 400 that can be utilized by the line-level writing drawing classification module 214 in accordance with one embodiment of the present technology. For example, a set of input features [x] 401 can be fed into the root 402 of the tree 400. In one type of implementations, each node (e.g., 404 and 406) of the tree 400 can make a decision based on one of the features. In this manner, each node will contain information on which feature to examine and what threshold value to test it against. It is pointed out that it is possible that the same feature with a different threshold may be used by more than one node (e.g., 404 and 406) of tree 400. The leaf nodes (e.g., 406) of tree 400 each contain "alpha" and "beta" votes. These votes are score values for each of the labels (or classes) of the one or more clusters. For example, there are two labels (or classes) such as writing and drawing. Thus, a leaf node can contain alpha and beta votes each containing a two score value corresponding to writing and drawing classes. It is noted that many of such decision trees (e.g., 400) can be formed during training using the AdaBoost Decision Tree technique, but is not limited to such. It is pointed out that decision tree 400 is an example binary decision tree. However in an embodiment, a multi-class decision tree could be used where the classes can be a writing, a drawing, and a composite group (e.g., a combination of writing and drawing).

In one embodiment where many such binary decision trees (e.g., 400) can be formed during training using the AdaBoost Decision Tree technique, each of these trees can examine one feature at every decision node in the implementation. Furthermore, the features can be extracted from the clusters. In an embodiment, each of these trees can follow a particular path to one of its leaf nodes which outputs an alpha or beta vote depending on the input. In this manner, each of the decision trees (e.g., 400) can generate one vote. These votes can be combined together by the line-level writing drawing classification module 214 to come up with a final decision of whether a cluster is a writing cluster or a drawing cluster. The line-level writing drawing classification module 214 can utilize one or more features to classify each cluster. For example in one embodiment, the line-level writing drawing classification module 214 can utilize can utilize or compute 37 features for each cluster. It is noted that some of these features can be solely based on clusters and some of the features can depend on the surrounding context. The following list of example features can be used by the line-level writing drawing classification module 214:

Line Features
Median of the lengths of the fragments
Variance of length of the fragments
Average width along the line per fragment (ratio between line width and fragment count)
Ratio between line height and median fragment length
Number of clusters in the line
Average cluster width
Median cluster height
Variance of cluster heights
Regression fitting confidence of the line
Cluster Features
Largest omni-directional-run length. Omni-directional-run can be the span on the major axis where projected points do not change direction.
Width of the cluster along the major axis of the line
Area under the rotated bound of the cluster
Stroke density. It can be defined as the ratio of the length of the strokes in the cluster to the area under the rotated bounding box of the cluster.
Minimum horizontal gap or overlap of the projection of strokes within a cluster on the major axis.
Ratio between sum of stroke length and horizontal range
Curvature of the largest fragment in the cluster
Width of the largest fragment in the cluster
Sum of curvatures of all the strokes in the cluster
Average writing score (e.g., adjusted output of the Neural Network-Hidden Markov Model engine)
Context Features
All of the cluster features of spatially nearest cluster
Cluster Stand-Alone Features
Number of fragments in the cluster
Average fragment length
Length of the largest fragment
Number of strokes in the cluster
Best Hypothetical Line Features. Best hypothetical line can be computed from the line neighborhood graph and with lowest fitting error.
Omni-directional run length computed for the hypothetical line
Horizontal length of the hypothetical line
Minimum horizontal gap or overlap amongst the projection of all the strokes in the hypothetical line
Regression fitting confidence of the hypothetical line It is pointed out that in one embodiment, the line-level writing drawing classification module 214 can be implemented with a second decision tree based engine which can operated on single cluster lines. As such, it can use one or more of the above features, but the decision trees it generates can be different from the one operating on all lines. Once the line-level writing drawing classification module 214 has completed the classification of each cluster as a writing or as a drawing, it can output the one or more classified clusters 230. In one embodiment, the line-level writing drawing classification module 214 can be configured for outputting any classification of the one or more clusters 230 as a writing or a drawing.

Example Methods of Operation

Figure 5:
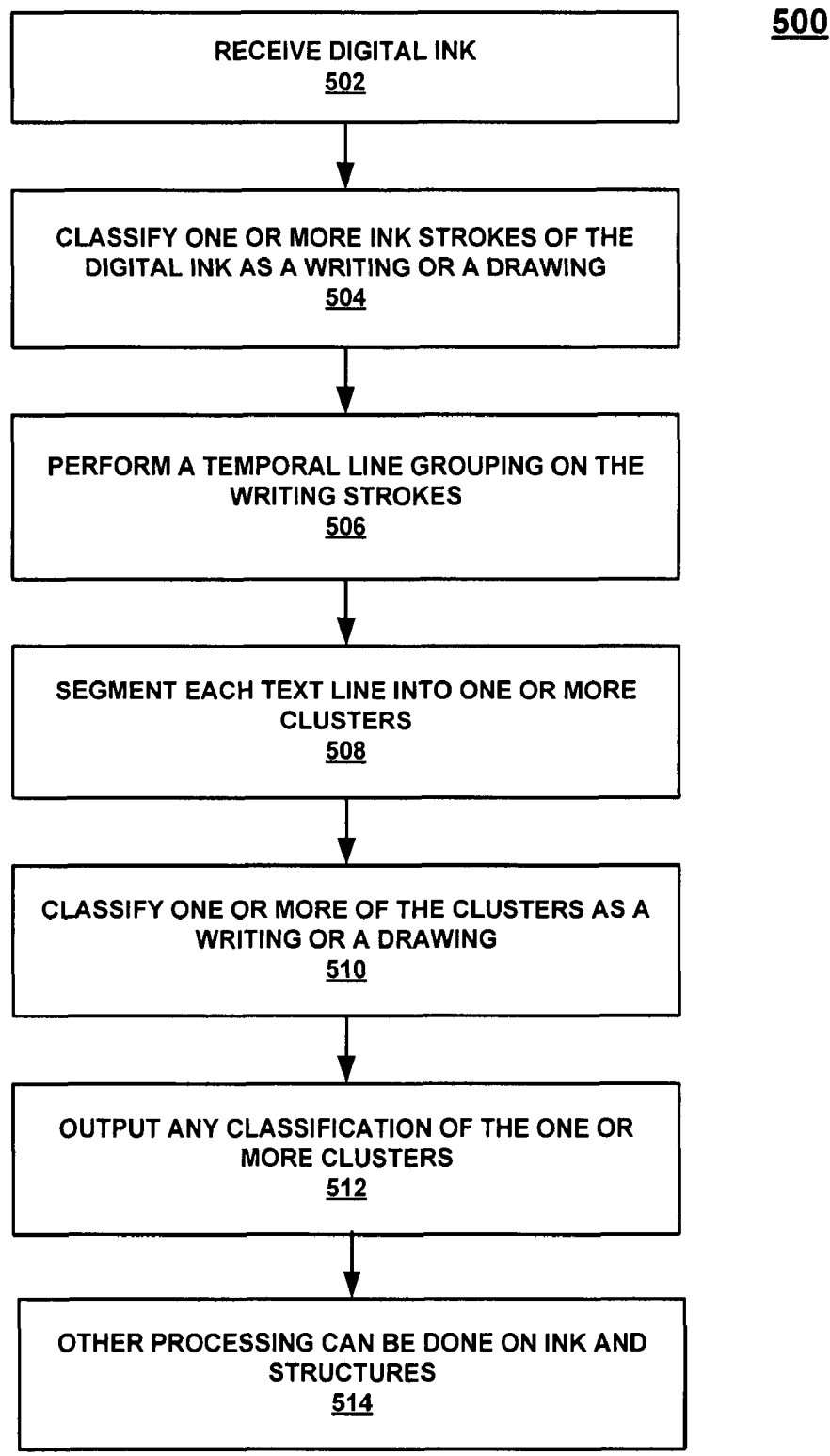
FIG. 5 is an example flow diagram of operations performed in accordance with one embodiment of the present technology.

The following discussion sets forth in detail the operation of some example methods of operation of embodiments of the present technology for classifying digital ink. With reference to FIG. 5, flow diagram 500 illustrates example operations used by various embodiments of the present technology for classifying digital ink. Flow diagram 500 include processes that, in various embodiments, are carried out by a processor (s) under the control of computer-readable and computer-executable instructions (or code), e.g., software. The computer-readable and computer-executable instructions (or code) may reside, for example, in data storage features such as computer usable volatile memory 108, computer usable non-volatile memory 110, peripheral computer-readable media 102, and/or data storage unit 112 of FIG. 1. The computer-readable and computer-executable instructions (or code), which may reside on computer useable media, are used to control or operate in conjunction with, for example, processor 106A and/or processors 106A, 106B, and 106C of FIG. 1. However, the computing device readable and executable instructions (or code) may reside in any type of computing device readable medium. Although specific operations are disclosed in flow diagram 500, such operations are examples. Method 500 may not include all of the operations illustrated by FIG. 5. Also, embodiments are well suited to performing various other operations or variations of the operations recited in flow diagram 500. Likewise, the sequence of the operations of flow diagram 500 can be modified. It is appreciated that not all of the operations in flow diagram 500 may be performed. It is noted that the operations of method 500 can be performed by software, by firmware, by electronic hardware, or by any combination thereof.

FIG. 5 is a flow diagram of an example method 500 for classifying digital ink in accordance with various embodiments of the present technology. Specifically, method 500 can include receiving digital ink that includes one or more digital ink strokes. One or more of the ink strokes can be classified as a writing or a drawing. A temporal line grouping can be performed on the writing ink strokes in order to form one or more text (or writing) lines. The one or more text lines can be segmented into one or more clusters. The one or more clusters can each be classified as a writing or as a drawing. Any classification of the one or more clusters can be output. Additionally, other processing can be performed on the one or more classified clusters. In this manner, the received digital ink can be classified. In this manner, method 500 includes a multiple stage classification of the digital ink.

Figure 6A:
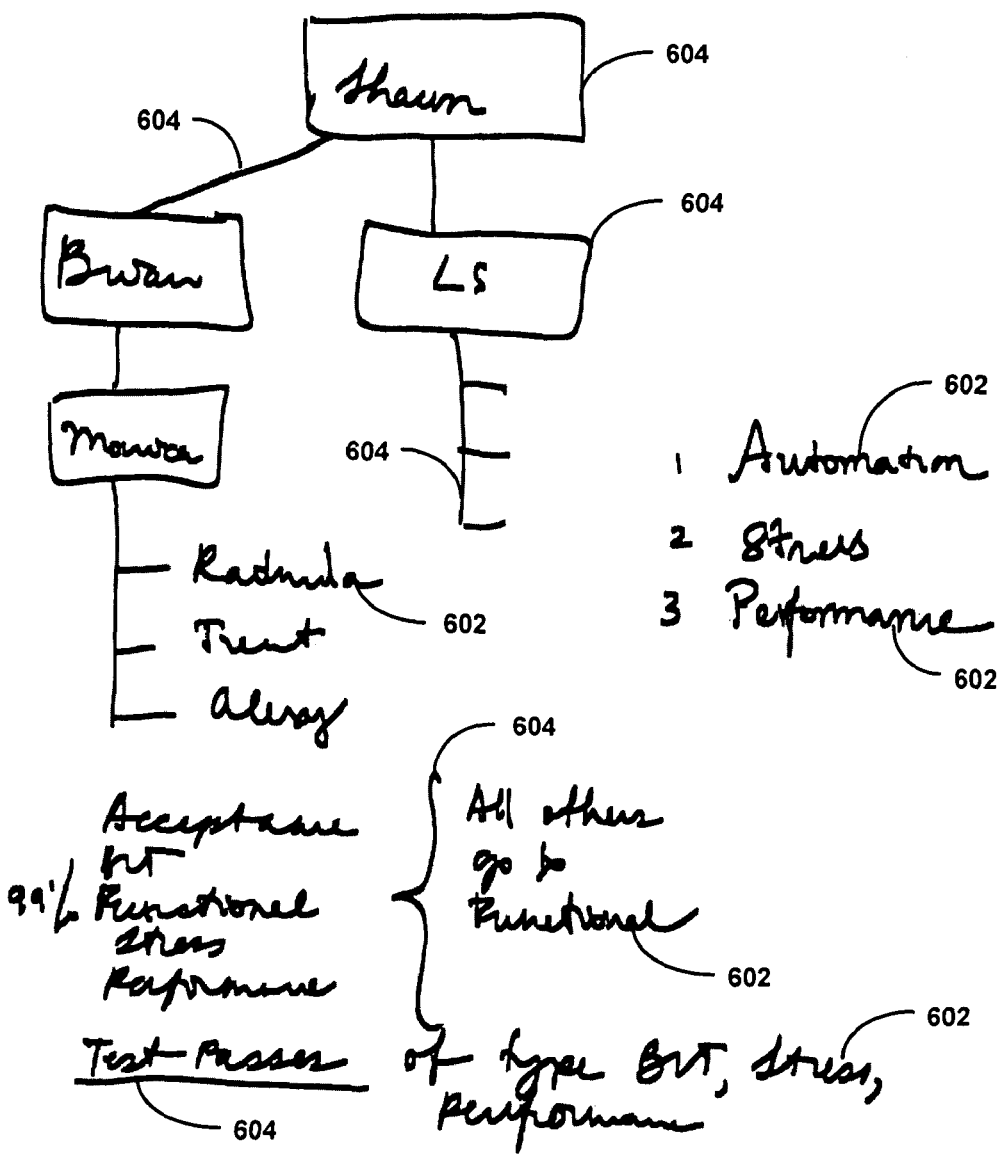
FIG. 6A is a diagram of an example digital ink document in accordance with one embodiment of the present technology.

At operation 502, digital ink or electronic ink (e.g., 202) can be received that includes one or more digital ink strokes (or electronic ink strokes). It is noted that operation 502 can be implemented in a wide variety of ways. For example in one embodiment, the digital ink can be implemented as, but is not limited to, a document of digital ink, a page of digital ink, real-time input of digital ink, and the like. It is pointed out that operation 502 can be implemented in any manner similar to that described herein, but is not limited to such. FIG. 6A is a diagram of an example digital ink document or page 600 in accordance with an embodiment. It is pointed out that in one embodiment, the digital ink document 600 can be received at operation 502. Furthermore, the digital ink document 600 can include ink strokes, such as, writings 602 along with drawings 604.

Figure 6B:
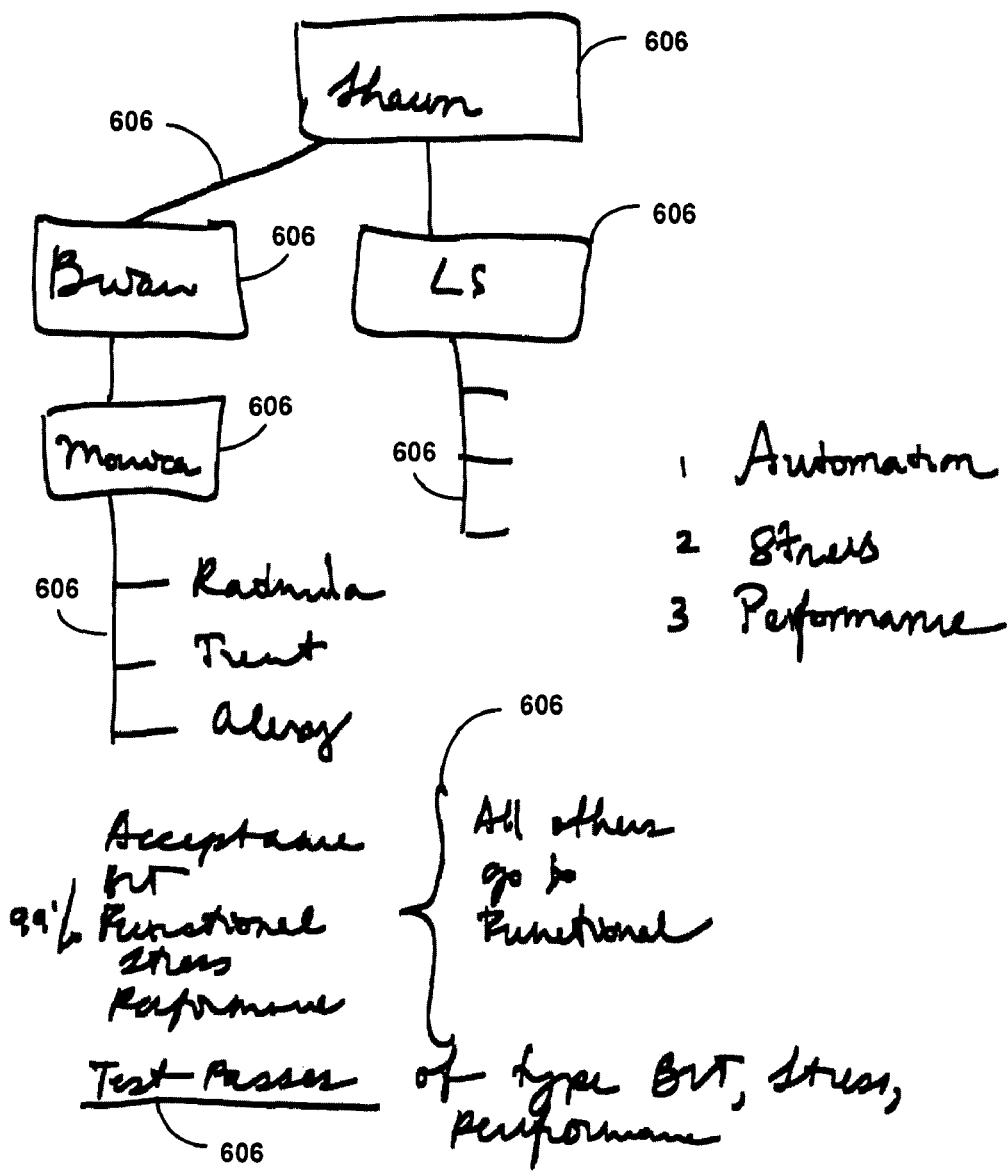
FIG. 6B is a diagram of an example stroke-level classification in accordance with one embodiment of the present technology.

At operation 504 of FIG. 5, one or more of the ink strokes can be classified as a writing or as a drawing, which can be referred to as a stroke-level classification. In this manner, operation 504 can involve determining if one or more of the ink strokes are a writing or a drawing. In one embodiment, the stroke-level classification at operation 504 can include filtering out any drawing ink strokes (e.g., 606 of FIG. 6) from any writing ink strokes (e.g., 612), but is not limited to such. Note that operation 504 can be implemented in a wide variety of ways. For example in one embodiment, the classifying of the ink strokes at operation 504 can include utilizing one or more machine learning techniques. In one embodiment, the one or more machine learning techniques can include, but are not limited to, a Hidden Markov Model, a decision tree, an AdaBoost decision tree, a neural network, a conditional random field technique, a support vector machine, and a machine learning classification technique. Operation 504 can be implemented in any manner similar to that described herein, but is not limited to such. FIG. 6B is a diagram of an example stroke-level classification that can take place at operation 504 in accordance with one embodiment of the present technology. For example, operation 504 can include looking at individual ink strokes of digital ink document 600 and filtering out the apparent drawing strokes (e.g., 606) which typically tend to be long and less curvy compared to normal handwritten text strokes.

Figure 6C:
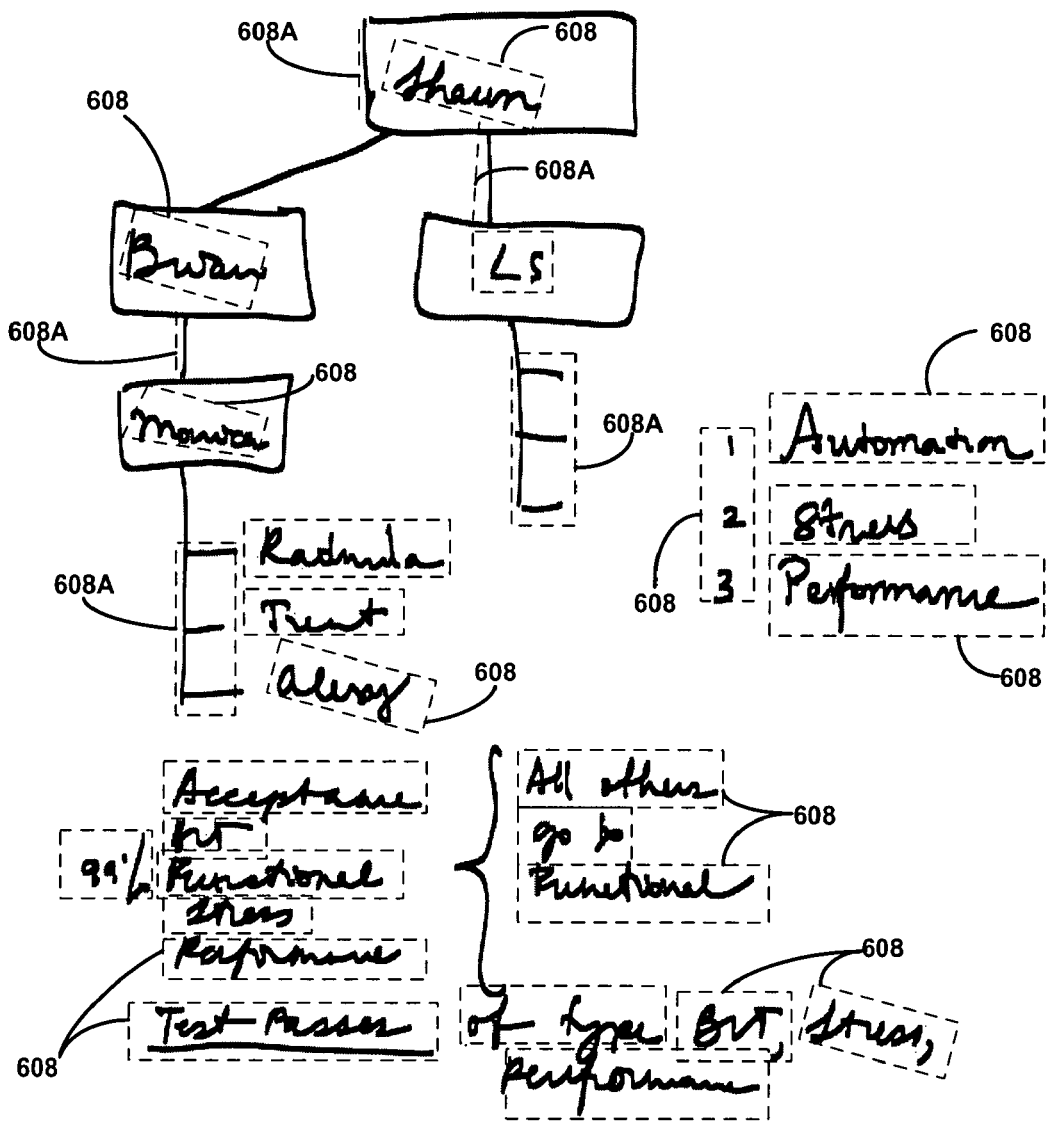
FIG. 6C is a diagram of an example temporal line grouping in accordance with one embodiment of the present technology.

At operation 506, a temporal line grouping can be performed on the one or more ink strokes that were classified as writing in order to form one or more writing (text) lines or temporal line groups. In this manner, operation 506 can involve producing one or more temporal line groups from the one or more ink strokes that were determined to be writing. Note that operation 506 can be implemented in a wide variety of ways. For example, operation 506 can be implemented in any manner similar to that described herein, but is not limited to such. FIG. 6C is a diagram of an example temporal line grouping that can take place at operation 506 in accordance with one embodiment of the present technology. For example, operation 506 can include utilizing time information associated with the ink strokes of the digital ink document 600. In an embodiment, operation 506 can include taking all the determined non-drawing writing strokes (shown within 608 and 608A), ordering them according to time in which they were created and separating them into segments 608 and 608A that look like a text line (e.g., ink strokes that are linear and are made up of similar size strokes). As such in FIG. 6C, operation 506 can result in good writing lines 608, but there can also exist one or more false writing lines 608A. It is pointed out that the one or more false writing lines 608A can be caused by incorrectly classified strokes at operation 504 or sometimes the time information can provide a wrong cue, such as, the bullet lines, or where a user wrote 1, 2, and 3 in a linear fashion, or later strokes. Note that process 500 can try to correct these false writing lines 608A at later operations (or stages).

At operation 508 of FIG. 5, each text line (or temporal line group) can be segmented into one or more clusters. In this manner, operation 508 can involve producing one or more clusters from each temporal line group. It is pointed out that operation 508 can be implemented in a wide variety of ways. For example, operation 508 can be implemented in any manner similar to that described herein, but is not limited to such.

Figure 6D:
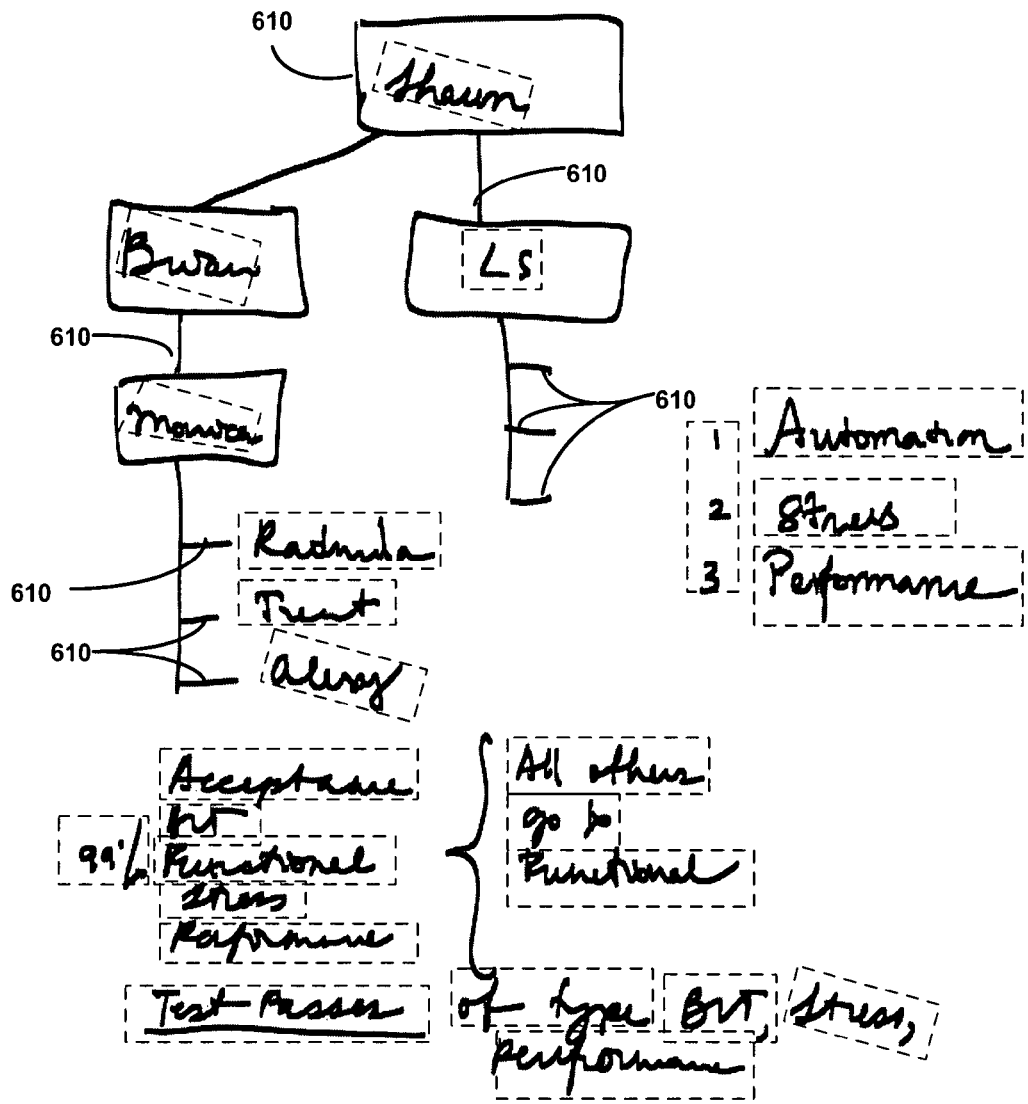
FIG. 6D is a diagram of an example cluster classification in accordance with one embodiment of the present technology.

At operation 510, the one or more clusters can each be classified as a writing or as a drawing. In this manner, operation 510 can involve determining if the one or more clusters are a writing or a drawing. In one embodiment, operation 510 can involve determining if one or more clusters are a writing, a drawing, or a composite group (e.g., a combination of writing and drawing). In an embodiment, operation 510 can involve filtering out one or more false writing clusters and/or lines (e.g., 608A). It is noted that operation 510 can be implemented in a wide variety of ways. For example, the classifying at operation 510 can include utilizing one or more machine learning techniques. In one embodiment, the one or more machine learning techniques can include, but are not limited to, a decision tree, a Hidden Markov Model, an AdaBoost decision tree, a neural network, a conditional random field technique, a support vector machine, and a machine learning classification technique. Operation 510 can be implemented in any manner similar to that described herein, but is not limited to such. FIG. 6D is a diagram of an example cluster classification that can take place at operation 510 in accordance with one embodiment of the present technology. For example, operation 510 can include utilizing some more advanced features and surrounding context information within digital ink 600 to filter out any false writing clusters or lines (e.g., 608A) and reclassify them as drawings 610. For example, the reclassified drawings 610 do not look like writing lines (e.g., 608) and they are also isolated. It is pointed out that operations 508 and 510 can be referred to as line-level classification.

At operation 512 of FIG. 5, any classification of the one or more clusters can be output. In this manner, operation 512 can involve outputting one or more classified or defined clusters. Note that operation 512 can be implemented in a wide variety of ways. For example, operation 512 can be implemented in any manner similar to that described herein, but is not limited to such.

At operation 514, other processing can be done on ink and structures. It is pointed out that operation 514 can be implemented in a wide variety of ways. For example, operation 514 can be implemented in any manner similar to that described herein, but is not limited to such. At the completion of operation 514, process 500 can be exited.

Example embodiments of the present technology for classifying digital ink are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for classifying digital ink, said method comprising:
    receiving digital ink comprising ink strokes;
    classifying a plurality of said ink strokes;
    performing a temporal line grouping on a plurality of said classified ink strokes to form a temporal line group;
    segmenting said temporal line group into a cluster; and
    classifying said cluster, at least some of at least one of the receiving, the classifying, the performing, the segmenting, and the classifying said cluster implemented at least in part via a microprocessor.

2. The computer-implemented method as recited in claim 1, wherein said classifying said cluster comprises:
    utilizing a machine learning technique.

3. The computer-implemented method as recited in claim 2, wherein said machine learning technique is selected from the group consisting of a Hidden Markov Model, a decision tree, an AdaBoost decision tree, a neural network, a support vector machine, a conditional random field technique, and a machine learning classification technique.

4. The computer-implemented method as recited in claim 1, wherein said performing a temporal line grouping comprises:
utilizing time information to order said plurality of said classified ink strokes.

5. The computer-implemented method as recited in claim 1, wherein said method comprises a multiple stage classification of said digital ink.

6. The computer-implemented method as recited in claim 1, wherein said classifying said cluster is selected from the group consisting of:
a writing, a drawing, and a composite group.

7. The computer-implemented method as recited in claim 1, wherein said classifying said plurality of said ink strokes is selected from the group consisting of:
a writing and a drawing.

8. A computer-readable device having computer-executable instructions for performing a method for classifying digital ink, said method comprising:
receiving digital ink comprising a plurality of digital ink strokes;
determining if a plurality of said ink strokes is a writing or a drawing;
producing a temporal line group from a plurality of said ink strokes determined to be writing;
producing a cluster from said temporal line group; and
determining what is said cluster.

9. The computer-readable device of claim 8, wherein said method comprises a multiple stage classification of said digital ink, wherein a later stage uses context information produced by an earlier stage.

10. The computer-readable device of claim 8, wherein the producing said temporal line group comprises:
utilizing a dynamic programming technique.

11. The computer-readable device of claim 10, wherein the determining if said plurality of said ink strokes are said writing or said drawing comprises:
utilizing a machine learning technique.

12. The computer-readable device of claim 11, wherein said machine learning technique is selected from the group consisting of a decision tree, a Hidden Markov Model, an AdaBoost decision tree, a neural network, a support vector machine, a conditional random field technique, and a machine learning classification technique.

13. The computer-readable device of claim 8, wherein the determining what is said cluster comprises:
utilizing a machine learning technique.

14. The computer-readable device of claim 8, wherein said determining what is said cluster is selected from the group consisting of a writing, a drawing, and a composite group.

15. A system for classifying digital ink, said system comprising:
a stroke classification module configured for receiving digital ink comprising ink strokes, said stroke classification module configured for classifying a plurality of said ink strokes as a writing or as a drawing;
a temporal line grouping module coupled with said stroke classification module, said temporal line grouping module configured for receiving any ink strokes classified as said writing by said stroke classification module, said temporal line grouping module configured for performing a temporal line grouping on said any ink strokes and for producing a line group; and
a line-level classification module coupled to receive said line group and configured for segmenting said line group into a plurality of clusters, said line-level classification module configured for classifying a cluster of said plurality of clusters as a writing or a drawing, at least some of at least one of the stroke classification module, the temporal line grouping module, and the line-level classification module implemented at least in part via a microprocessor.

16. The system of claim 15, wherein said line-level classification module utilizes a machine learning technique for segmenting said line group.

17. The system of claim 16, wherein said machine learning technique is selected from the group consisting of a classification based on a feature of an elements of said line group, a sequence of classifications of said line group, a Hidden Markov Model, a decision tree, an AdaBoost decision tree, a neural network, a support vector machine, a conditional random field technique, and a machine learning classification technique.

18. The system of claim 15, wherein said system comprises a multiple stage classification of said digital ink, wherein a later stage corrects a classification of produced by an earlier stage.

19. The system of claim 15, wherein said stroke classification module is configured for receiving said digital ink in real-time.

20. The system of claim 15, wherein said line-level classification module is configured for outputting any classification of said cluster.

* * * * *